US005842554A

United States Patent [19]

Stöxen et al.

[11] Patent Number: 5,842,554

[45] Date of Patent: Dec. 1, 1998

[54] PASSENGER SENSOR FOR A CONVEYOR

[75] Inventors: Oliver Stöxen, Seelze; Dietmar Krüger, Rintein, both of Germany

[73] Assignee: Otis Elevator Company, Farmington, Conn.

[21] Appl. No.: 688,931

[22] Filed: Jul. 31, 1996

[51] Int. Cl.[6] .......................... B65G 15/00; B65G 35/04; B65G 43/00; B65G 43/08

[52] U.S. Cl. .......................................... 198/322; 198/323

[58] Field of Search .................................. 198/322, 323

[56] References Cited

U.S. PATENT DOCUMENTS

| | | | |
|---|---|---|---|
| 1,438,112 | 12/1922 | Hendricks | 198/322 |
| 1,987,272 | 10/1935 | Sprecker | 198/322 |
| 2,057,911 | 10/1936 | Obergfell | 198/322 |
| 2,147,979 | 2/1939 | Kearney | 198/322 |
| 2,983,358 | 5/1961 | Clemetsen et al. | 198/322 |
| 4,088,219 | 5/1978 | Binns | 198/323 |
| 4,499,986 | 2/1985 | Tsuboi et al. | 198/322 |
| 4,951,786 | 8/1990 | Haraguchi | 187/1 R |

FOREIGN PATENT DOCUMENTS

| | | |
|---|---|---|
| 531273 | 8/1983 | Australia . |
| 2313422 | 9/1974 | Germany . |

*Primary Examiner*—William E. Terrell
*Assistant Examiner*—Joe Dillon, Jr.

[57] ABSTRACT

A passenger sensor for a passenger conveyor is disposed adjacent to a floorplate and produces a signal in response to changes in the load on the floorplate, rather than in response to a predetermined level of load. This results in a passenger sensor that does not require adjustment to accommodate the changing conditions of the passenger conveyor. In a particular embodiment, the passenger conveyor includes a passenger sensor that is formed from a piezoelectric cable that extends about the perimeter of the floorplate. The piezoelectric cable is connected to a controller that determines the operational speed of the passenger conveyor. Changes in the load on the floorplate, such as caused by a passenger entering the passenger conveyor, result in the piezoelectric cable generating a signal that is received by the controller. The controller then adjusts the operation speed of the passenger conveyor in response to the signal.

13 Claims, 2 Drawing Sheets

PASSENGER SENSOR FOR A CONVEYOR

TECHNICAL FIELD

The present invention relates to passenger conveyors, and more particularly to passenger sensors for such conveyors.

BACKGROUND OF THE INVENTION

Passenger conveyors, such as escalators and moving walks, are efficient means of transporting passengers from one landing to another. A typical passenger conveyor includes a plurality of sequentially connected treadplates that move through a closed loop path between the landings. The treadplates, which may be steps or pallets, are driven continuously through the path by a motor.

In an effort to save costs, many passenger conveyors are either switched off or are operated at a reduced speed if there are no passengers riding the conveyor. This is accomplished by having a sensor that detects the presence of passengers entering the conveyor. Upon sensing the presence of passengers, a controller starts or accelerates the operation of the conveyor to the transport speed while passengers are present. If no further passengers are detected, the conveyor is either stopped or operated at the reduced speed until another passenger is detected.

Several devices have been used to detect the presence of passengers entering the conveyor. A common device is a simple mechanical limit switch placed under the floorplate. The switch is actuated by movement of the floorplate. If a load is placed on the floorplate that exceeds a predetermined threshold, the load causes the floorplate to move an amount sufficient to actuate the switch. These devices require springs to support the load of the floorplate so that the mass of the floorplate alone does not actuate the switch. Over time and usage the springs wear and must be replaced to ensure effective operation. In addition, the switches are difficult to adjust for proper operation and are sensitive to the dirt and debris that may accumulate around the floorplate.

Another common device is to project a beam of light across the entrance to the passenger conveyor. If this beam of light is broken by a passenger, the conveyor is switched to the transport speed. These devices, however, require the use of a housing that supports the beam in order to project it at an appropriate height. The housing may be unsightly and is subject to vandalism that may negate the energy savings, such as by placing an object in a position to continuously interrupt the beam of light.

A further device is the use of a fiber optics sensor placed under the floorplate. Much like the mechanical limit switches, the fiber optics sensor responds if the load on the floorplate, and thereby the fiber optics sensor, exceeds a fixed reference point based upon a threshold level of load. Such devices are very sensitive and also require the floorplate to be supported, such as by springs, to prevent the floorplate alone from triggering the sensor. Further, as a result of their sensitivity these devices require frequent adjustment, which increases the maintenance costs of the passenger conveyor.

The above art notwithstanding, scientists and engineers under the direction of Applicants' Assignee are working to develop passenger sensing devices that are reliable and require minimal maintenance.

DISCLOSURE OF THE INVENTION

The present invention is predicated in part upon the recognition that devices that react to changes in the load on the floorplate regardless of the absolute level of the load, rather than devices that react only if the load on the floorplate exceeds a predetermined threshold or fixed reference level, will not require adjustment to accommodate changes in the condition of the floorplate and of other structural components.

According to the present invention, a passenger sensor for a passenger conveyor is disposed adjacent to a floorplate and produces a signal in response to changes in the load on the floorplate.

An advantage of the present invention is that there is no longer a need to adjust and maintain the floorplate and sensor to accommodate for changes in the condition of the floorplate or any other structures in the nearby environment of the passenger sensor. Since the sensor only reacts to a change in load on the floorplate and not to the absolute level of load, any changes that are the result of wear are automatically accommodated.

In one particular embodiment, the passenger sensor is formed from a piezoelectric cable that extends about the perimeter of the floorplate. This type of sensor is particularly advantageous since at installation it will require only a simple electrical adjustment to ensure that the device responds to changes in load of a predetermined level. There is no need for a mechanical adjustment since no motion of the floorplate is required. Further, since no motion of the floorplate is required to actuate the sensor, the detrimental effects of dirt and other debris around the floorplate are eliminated.

According to a specific embodiment of the present invention, a passenger conveyor includes a passenger sensor producing a signal in response to changes in the load on a floorplate and a controller in communication with the sensor. Changes in the load on the floorplate, such as by a passenger entering the passenger conveyor, result in the sensor communicating a signal to the controller. Upon receiving a signal from the sensor indicating that a passenger is entering the conveyor, the controller accelerates the speed of the conveyor to the transport speed.

"Passenger conveyor" as used herein is defined to include all conveying devices that transport passengers between two predetermined landings, such as escalators and moving walks.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
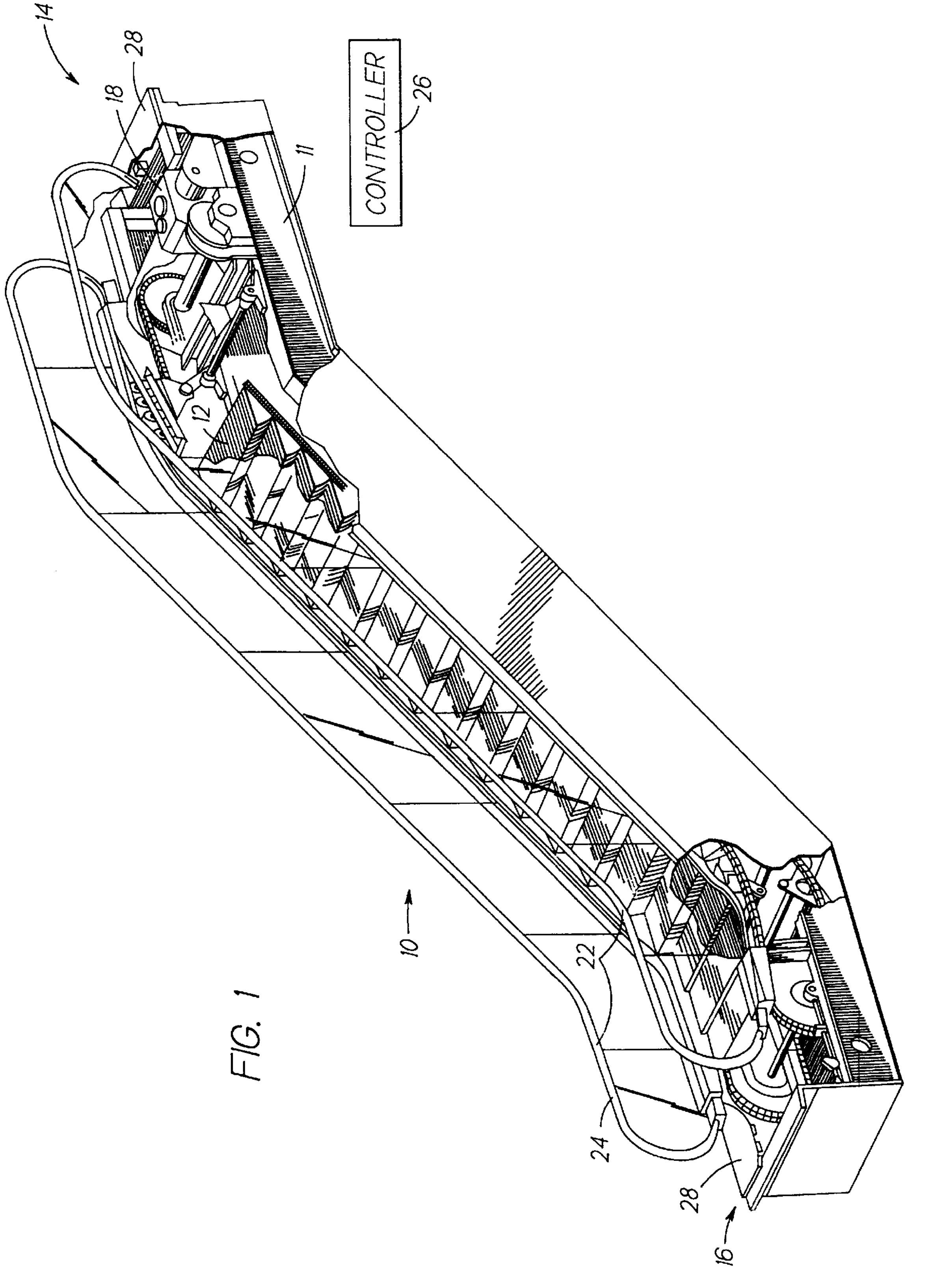
FIG. 1 is a perspective view of an escalator.

An escalator 10 is shown in FIG. 1 as an exemplary embodiment of a passenger conveyor. The escalator 10 includes a truss 11, a plurality of sequentially connected steps 12 traveling a closed loop path between an upper landing 14 and a lower landing 16, a motor 18 that drives the steps 12, a balustrade 22 having a pair of moving handrails 24, and a controller 26. The controller 26 is in communication with the motor 18 and various sensors disposed throughout the escalator 10. Based upon inputs from these sensors, the controller 26 determines the operational status of the escalator 10.

Figure 2:
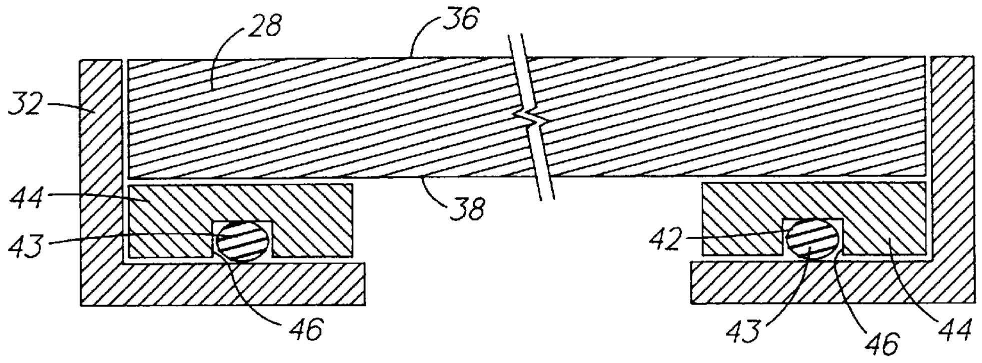
FIG. 2 is a sectional view of the floorplate, passenger sensor and resilient support.

Each landing 14,16 includes a floorplate 28 that is disposed within a frame 32 as shown in FIG. 2. The floorplate 28 is a plate that extends primarily in a twodimensional plane and has an upper surface 36 facing outward that defines a contact surface for passengers and a lower surface 38. A passenger sensor 42 is positioned between the lower surface 38 and the frame 32 and is seated within a resilient support 44 for the floorplate 28. The mass of the floorplate 28 and any additional loads applied to the floorplate 28 result in a corresponding load being transferred to the passenger sensor 42.

The passenger sensor 42 is a piezoelectric cable 43 that defines means for the passenger sensor 42 to react to changing loads on the floorplate 28. The passenger sensor 42 is calibrated to produce a signal based upon a predetermined relative variation in the load. The level of variation is relative to the time preceding the change in load, and not relative to a fixed reference point based upon a threshold load. The support 44 provides a seat 46 for the piezoelectric cable 43 and prevents damage from occurring to the piezoelectric cable 43 in the event of an impact or excessive loads on the floorplate 28.

Figure 3:
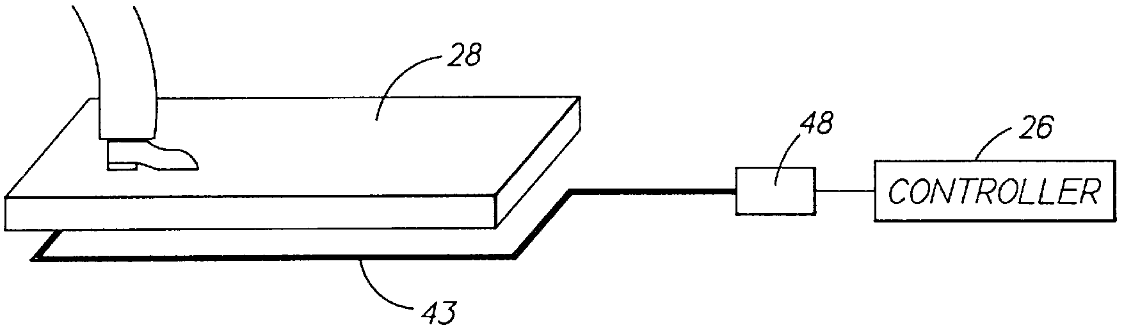
FIG. 3 is a schematic representation of the floorplate and passenger sensor to illustrate the operation of the escalator.

As shown schematically in FIG. 3, the piezoelectric cable 43 extends about the outer edges or perimeter of the floorplate 28. The piezoelectric cable 43 is connected to an amplifier 48 and then to the controller 26. The amplifier 48 provides means to amplify the signal generated by the piezoelectric cable 43 for reception by the controller 26.

During operation of the escalator 10, if no passengers step onto the floorplate 28 of the escalator 10, the escalator 10 is maintained at a reduced speed. The load of the floorplate 28 will not trigger the piezoelectric cable to produce a signal since this load is constant over time, i.e., it does not exceed the predetermined variation load. Without a change in the load on the piezoelectric cable 43, the sensor 42 will not react.

Once passengers enter the escalator 10 and step upon the contact surface 36 of the floorplate 28, the weight of the passenger causes the load on the floorplate 28 to vary. This also results in a corresponding change in the load on the piezoelectric cable 43. Since the piezoelectric cable 43 responds to changes in the load, a signal is sent through the amplifier 48 and to the controller 26. The controller 26 receives this signal as a indication of a passenger entering the escalator 10 and responds by accelerating the speed of the escalator 10 to the transport speed. This speed is maintained a sufficient amount of time to permit the passenger to travel to the opposite landing. If no further passengers step onto the floorplate 28, i.e., if the load on the piezoelectric cable 43 remains constant, the controller 26 reduces the operational speed of the escalator 10.

If the loading on the piezoelectric cable 43 caused by the floorplate 28 or support 44 changes for any reason, as long as the load on the piezoelectric cable 43 remains relatively constant over time it will automatically adjust to accommodate this change. An example might be the gradual deformation of the floorplate 28 in response to the fatigue loading caused by passengers. Although this deformation may change the load of the floorplate 28 on the passenger sensor 42, since the change will be fairly constant over time, the passenger sensor 42 will not require readjustment.

Although the passenger sensor is shown in FIG. 2 and 3 and a piezoelectric cable, it should be understood that other variations of sensors that react to changing loads rather than the level of the load may be used, such as discrete piezoelectric sensors. An advantage of the cable type sensor is that it is easy to install. A single or a plurality of discrete sensors would have to be properly positioned to ensure that any change in load on the floorplate caused by a passenger will result in a change in the load on the sensors In addition, the embodiment shown in FIGS. 1-3 includes a passenger sensor in each landing. In some applications it may only be necessary to include the passenger sensor in one of the landings, for example, if it is known which landing will be used predominantly as the entrance to the passenger conveyor.

Although the invention has been shown and described with respect to exemplary embodiments thereof, it should be understood by those skilled in the art that various changes, omissions, and additions may be made thereto, without departing from the spirit and scope of the invention.

What is claimed is:

1. A passenger sensor in a passenger conveyor, the passenger conveyer having a first operational speed and a transport speed including one or more treadplates that move through a closed loop path between a pair of predetermined landings, a floorplate defining a contact surface for passengers entering the passenger conveyor, and whereby passengers engaging the contact surface produce a time varying load on the floorplate, the passenger sensor being engageable with the floorplate such that the time varying load is sensed by the sensor, and wherein the sensor is responsive to relative changes in the load on the floorplate that exceed a predetermined variation in the load over time to indicate entry of passengers onto the passenger conveyor and is not responsive to loads that are constant over time, the sensor producing a signal for causing alteration of the conveyor between said first operational speed and said transport speed.

2. The passenger sensor according to claim 1, wherein the sensor is a peizoelectric sensor.

3. The passenger sensor according to claim 1, further including a resilient support disposed between the floorplate and the sensor.

4. The passenger sensor according to claim 3, wherein the support includes a seat for the sensor.

5. The passenger sensor according to claim 1, wherein the floorplate has edges defining the perimeter of the floorplate, wherein the sensor is a longitudinally extending cable, and wherein the sensor is positioned along the perimeter of the floorplate.

6. The passenger sensor according to claim 5, wherein the sensor is formed from a piezoelectric cable.

7. A passenger conveyor having a first operational speed and a transport speed, the passenger conveyor including a passenger load carrying surface moving from a first landing to a second landing through a closed loop path, a floorplate adjacent the first landing, the floorplate defining a contact surface for passengers entering the passenger conveyor, whereby passengers engaging the contact surface produce a time varying load on the floorplate, a passenger sensor engaged with the floorplate such that a corresponding time varying load is sensed by the sensor, the sensor being responsive to relative changes in the load on the floorplate that exceed a predetermined variation in the load over time to indicate entry of passengers onto the passenger conveyor and not responsive to loads that are constant over time, whereupon the response of the passenger sensor to the time varying load switches the passenger conveyor from the first operational speed, the sensor producing a signal for causing alteration of the conveyor between said first operational speed and said transport speed to the transport speed to the transport speed.

8. The passenger conveyor according to claim 7, further including a controller for controlling the operation of the passenger conveyor, wherein the sensor is in communication with the controller, and whereby the signal is communicated to the controller to cause the controller to switch the operational speed of the passenger conveyor.

9. The passenger conveyor according to claim 7, wherein the sensor is a piezoelectric sensor.

10. The passenger conveyor according to claim 7, further including a resilient support disposed between the floorplate and the sensor.

11. The passenger conveyor according to claim 10, wherein the support includes a seat for the sensor.

12. The passenger conveyor according to claim 7, wherein the floorplate has edges defining the perimeter of the floorplate, wherein the sensor is a longitudinally extending cable, and wherein the sensor is positioned along the perimeter of the floorplate.

13. The passenger conveyor according to claim 12, wherein the sensor is formed from a piezoelectric cable.

* * * * *